United States Patent [19]

Schnitzer et al.

[11] Patent Number: 4,523,747
[45] Date of Patent: Jun. 18, 1985

[54] DISCHARGING MOLTEN METAL FROM A SMELTING FURNACE

[75] Inventors: Heinrich Schnitzer, Rheinberg; Bodo Wronka, Duisburg, both of Fed. Rep. of Germany

[73] Assignee: Mannesmann Ag, Duesseldorf, Fed. Rep. of Germany

[21] Appl. No.: 531,055

[22] Filed: Sep. 12, 1983

[30] Foreign Application Priority Data

Jun. 15, 1983 [DE] Fed. Rep. of Germany ....... 3321576

[51] Int. Cl.³ .............................................. C21B 15/00
[52] U.S. Cl. ..................................... 266/44; 266/196; 266/236; 222/590; 222/605
[58] Field of Search ................. 266/44, 236, 240, 161, 266/164, 171, 195, 196, 45; 373/44, 45, 71, 72, 79, 84, 83, 115, 142, 143; 432/157, 160; 75/24, 92; 222/590, 604, 605

[56] References Cited

U.S. PATENT DOCUMENTS

| | | | |
|---|---|---|---|
| 1,036,500 | 8/1912 | Lamb | 266/240 |
| 2,458,236 | 1/1949 | Wolff | 266/240 |
| 2,800,405 | 7/1957 | Rinesch | 75/24 |
| 2,880,989 | 4/1959 | Stauffer | 266/196 |
| 3,340,045 | 9/1967 | Colwell | 75/24 |
| 3,684,261 | 8/1972 | Wynne | 266/240 |
| 3,848,072 | 11/1974 | Dershem et al. | 373/115 |
| 3,849,117 | 11/1974 | Philpotts | 75/24 |
| 4,031,309 | 6/1977 | Chitil et al. | 266/240 |
| 4,385,748 | 5/1983 | Murakami | 266/44 |

FOREIGN PATENT DOCUMENTS 1804007  6/1970  Fed. Rep. of Germany.
2944269  5/1981  Fed. Rep. of Germany.

*Primary Examiner*—L. Dewayne Rutledge
*Assistant Examiner*—Robert L. McDowell
*Attorney, Agent, or Firm*—Ralf H. Siegemund

[57] ABSTRACT

Slag-free discharge of molten metal from a smelting furnace is assured either through slow tilting through a small angular range in case the outlet is located in a lateral bay extension of the furnace such that maximum depth level is retained above the outlet and the furnace is tilted back to a slight negative angle once the formation of eddys that could suck slag into the outlet becomes likely. In the case of a central discharge outlet, maximum depth level is still maintained above the outlet but the slag is stiffened, i.e. rendered highly viscous, so that any eddy will not tear slag particles off and suck it into the outlet. Certain ratios of water cooled surfaces to fire proof surfaces are to be observed.

10 Claims, 9 Drawing Figures

DISCHARGING MOLTEN METAL FROM A SMELTING FURNACE

BACKGROUND OF THE INVENTION

The present invention relates to the operation of a metallurgical smelting furnace, particularly of the electro-plasma type, or more generally of the type in which the content of the furnace is heated by the development of primary energy. The smelting furnaces of the type to which the invention pertains require frequently that following the completion of the smelting process, the metal be removed without any inclusion of slag. In this regard, it has been suggested to discharge the molten metal eccentrically and from the bottom of the furnace upon opening a suitable closing device so that the molten metal can flow down in vertical direction. The discharge may be controlled by means of tilting the furnace. Alternatively, the discharge may occur centrally without tilting.

The discharge of a smelting furnace from the bottom of the vessel should occur in a laminar or near laminar flow. However, the mere discharge by means of pouring the molten metal out of the furnace does usually not suffice for preventing the outflow of slag nor is it sufficient to avoid particularly the mixture of slag with the pure molten metal. This is particularly due to the development of an eddy in the pouring flow that sucks slag into the outlet. Therefore, it is usually required to provide for specific steps that prevent the outflow of slag.

In the case of a tiltable furnace this prevention is obtained by a controlled tilting operation to thereby interrupt temporarily the discharge whenever slag is about to be commingled with the pure metal. It is apparent that the molten metal must be free from slag, particularly in cases in which subsequently casting or other refining-type treatment is provided for. Also, the prevention of slag inclusion is important as generally one operates with a liquid sump and uses scrap or scaly iron as charge. On the other hand, it can readily be seen that the interruption of the discharge in the manner described above means an interruption of the discharge process as a whole while particularly during periods of discharge flow the inclusion of slag is not preventable per se. In particular, the overall operation of the furnace discharge process is not of immediate relevancy nor of direct influence upon the flow pattern in the interior of the furnace vessel such that slag will or will not be included in the outpouring flow thereafter.

German printed patent application No. 18 04 007, suggests that the smelting furnace should be discharged only, i.e. the discharge process should begin only when the closure is, in fact, open in an extreme tilting position. This procedure assumes that a slag-free outpour will develop in this particular position of the furnace, but does not consider the interplay between the overall flow pattern of the molten metal within the furnace once the flow has begun in relation to the present distribution of the slag and the potential conditions for inclusion of slag particles in that flow. In other words, this method assumes certain statistical relations without consideration of basically unforeseen details in the flow pattern.

German printed patent application No. 29 44 269, suggests a particular configuration of the furnace cavity wherein a particular extension establishes a subcavity which communicates with the furnace interior at large by means of a flow passage arranged laterally near the bottom of the pan-shaped portion of the furnace interior. In this fashion, the metal is separated in this extension from the slag by means of a closure body floating in the metal bath such that a slag-free removal is, in fact, rendered dependent upon the presence and particular function of that floating closure body. However, the discontinuance of the discharge will prevent outflow of slag only towards the end of a pass in order to avoid a more significant disadvantage. As far as is known, no feature or concept is known at this point which prevents the outflow of slag in a comparable manner prior to the termination of the discharge pass of molten metals.

DESCRIPTION OF THE INVENTION

It is an object of the present invention to improve the discharge of molten metal, preferably of steel from a metallurgical furnace under avoidance of inclusion of slag during the discharge so that the discharged metal remains at least substantially free from slag.

In accordance with the preferred embodiment of the present invention, it is suggested to make sure during the discharge that an uncritical level of molten metal is maintained above the outlet, at least as long as is possible so that the formation of a discharge eddy is avoided as that eddy is a major contributing source for sucking slag into the outpouring flow. In realizing the inventive concept it is essential that the furnace be constructed to exhibit a particular high surface ratio of the furnace interior, the ratio involved being the water cooled surface area and the fire proof refractory surface area. In the case of a furnace with eccentrically disposed discharge outlets under utilization of a bay, the ratio should remain in the range of 6:1 to 9:1 whereas in the case of a central outflow, the range of ratio should be from 7:1 to 10:1.

The discharge procedure differs for eccentric and centric discharge outlets. In the case of an eccentric discharge outlet situated in a bay extension of the furnace tank, one tilts the furnace during discharge from a basically upright position to not more than 15° so as to maintain a maximum depth level of molten metal above the discharge outlet. A critical depth level is one which renders probable the formation of a discharge eddy. As soon as such a critical depth is reached, the vessel is tilted back, possibly to an opposite, i.e. negative tilt of not more than 6° so that slag and residual metal flows back and away from the discharge outlet. Therefore, the vessel and furnace is not completely discharged and the residue is used in the next smelting run. The choice of surface ratio of water cooled to fire proof surface areas is important because not only is fire proof material not required to a limited extent only, but one can use a tilting angle as small as possible without incurring the danger that slag contacts water cooled tubular wall elements; such a contact could be highly detrimental to the wall construction. Maintaining maximum depth level above the eccentric discharge avoids as long as possible the formation of a suction eddy while the negative tilt range suffices in order to positively prevent all slag from reaching the outlet.

Broadly speaking, an uncritical bath depth and level exists as long as no slag can be sucked into the outlet be it due to formation of an eddy while supplemental criterium refers to exclusive engagement of molten material, including slag, or fire proof material only and not any water cooled tubular wall elements. This, of course, requires that the tilt be established gradually and a larger tilting angle will concur only onto a near empty furnace vessel. It should be considered here that one must obtain a trade off in the sense that the avoidance of slag inclusion is, of course, instrumental in enhancing the quality of the final product. On the other hand, capital expenditure must not be unduly increased. The proposed mode of operation permits, indeed, an improvement of quality not only without increase in operating and capital investment costs but the amount for these expenditures are actually lowered.

In the case of a discharge outlet that is centrally disposed in the bottom of the furnace tank, the procedure is somewhat different though it is essential to maintain maximum bath level depths from the outlet throughout. This, however, does not necessarily entail any tilting. Instead, the slag is, of course, removed to the utmost extent possible prior to discharge and a stiffening material is added such that the residual slag layer becomes a highly viscous, near-solid cover. As the bath level is lowered the formation of an eddy is unavoidable but the enhanced viscosity of the slag layer prevents the eddy from tearing slag particles away and sucking slag into the outpouring flow. In this case, one can even save more fire proof material as is reflected in the above given range of surface ratios. Towards the end of the outflow, the more or less coherent thin slag layer will be deposited upon the bottom of the tank and will either separately be discharged or mixed with the next charge.

The two approaches actually are effective in lower temperature losses so that the discharge temperature can be about 20° Centigrade below subsequent treatment temperatures by means of which, for example, the steel is enhanced in quality. The discharge flow will be laminar or near-laminar which permits that a capturing vessel can be disposed underneath the furnace at a spacing of not more than 1 m between the outer surface of the tank near the outlet and the rim of the capturing vessel.

In the case eccentric discharge, the furnace is to be provided with a bay being of trapezoidal or rectangular elevation, the outlet being located on a line of symmetry through the bay and the legs of the trapeze are tangential to the round of the elevational interior or secants thereto if they are rectangularly arranged. This feature is important as any potential eddy can be supported by three walls without having to react into the slag layer, the slag, therefore, is not interfered with and quietly lowered toward the bottom. The vessel may be provided with a supplemental opening the center of the vessel.

DESCRIPTION OF THE DRAWINGS

While the specification concludes with claims particularly pointing out and distinctly claiming the subject matter which is ragarded as the invention, it is believed that the invention, the objects and features of the invention, and further objects, features and advantages thereof, will be better understood from the following description taken in connection with the accompanying drawings, in which:

Proceeding now to the detailed description of the drawings, FIGS. 1-4 illustrates a smelting furnace which includes a tank portion with lateral, bay-like extensions 2 having at its bottom portion or underside a plug and closure member 3. This member 3 may, for example, be comprised of a positionable closure flap for closing the discharge outlet from the tank 1. The opening 4 is provided eccentric to the basically round configuration of the tank. During the smelting of metal outlet or duct 4 is filled with a suitable material to protect the closure member 3 from the molten metal. If, for example, steel is melted and smelted in this furnace the temperature may well exceed 1,500° C.

Figure 1:
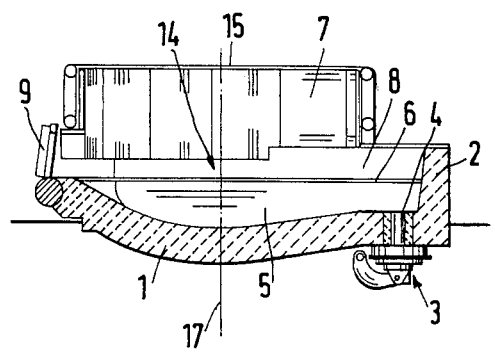
FIGS. 1, 2, 3 and 4 are cross sections through a smelting furnace showing sequential phases for the discharge of molten metal with an eccentrically disposed bottom outlet.

During the smelting process as shown in FIG. 1, the molten steel 5 carrying a residual slag layer 6 reaches just below the water cooled wall surface 7 but still engages only fireproof surface portion 8 made of refractory fire-proof bricks. It is for this reason (and others to follow) that the surface ratio of surfaces 7 and 8 should be about 6:1 to 9:1.

In order to remove the main portion of the slag, a slag outlet 9 is provided. Slag will be removed through this outlet separately and basically diametrically opposed to the outlet 4 for steel. Also, of course, the level of the two outlets differ so that the main portion of the slag is removed at a high level, and the steel is removed from a low level under conditions avoiding an outflow of such residual slag.

Figure 2:
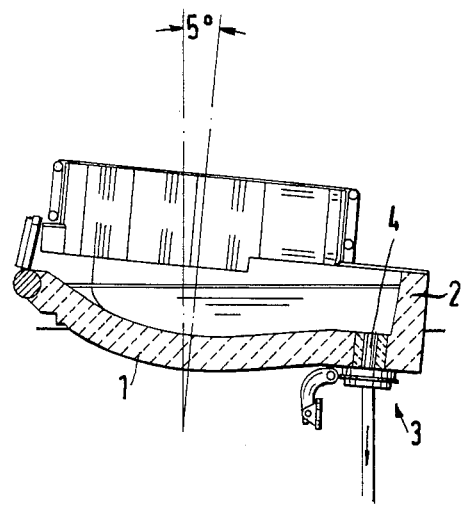
Figure 3:
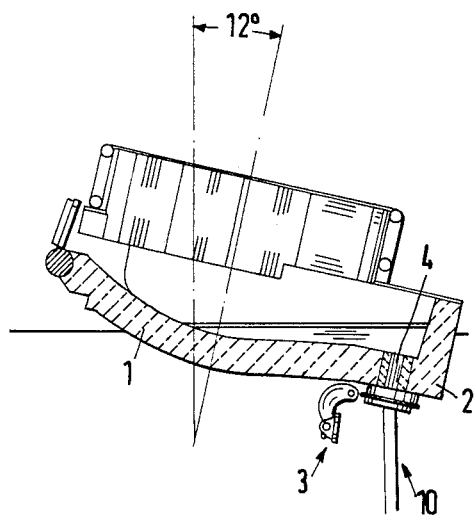

The smelting furnace and tank 1 can be tilted by means of a tilting structure which is not illustrated and can be deemed conventional. This tilting facility includes a tilting drive which permits tilting in fine steps or on a continuous basis. After the closure member 3 has been opened in FIG. 2, the furnace is tilted to about 5° so that a sufficiently high bath level is provided above the opening or outlet 4. This way potential eddys are avoided, and the maximum depth level of molten steel exits through outlet 4. A casting outflow 10, i.e. a stream of discharging steel leaves the vessel upon opening of closure member 3 and in a near laminar flow.

Following the initial discharge flow, the tank 1 is tilted further either in small steps or on a continuous basis until a total tilting angle from 8° to 12° has been attained; the larger angle may not always be necessary. The smelting bath level above the opening door still suffices to avoid the formation of eddys about outlet 4. Should potential eddy and eddy streams be produced in the last phase of outpouring, they react their energy into the walls of the trapezoidal bay (FIG. 8).

Figure 4:
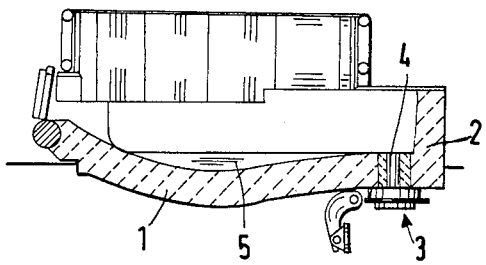

The last phase of steel pouring, FIG. 4, is to be seen in a negative tilt. During this reverse tilting, the slag will flow away from the opening 4 and slide back into the lower portion of the tank bottom. The residual metal sump 5 and slag thereon are used for the next cycle with a new charge.

Figure 8:
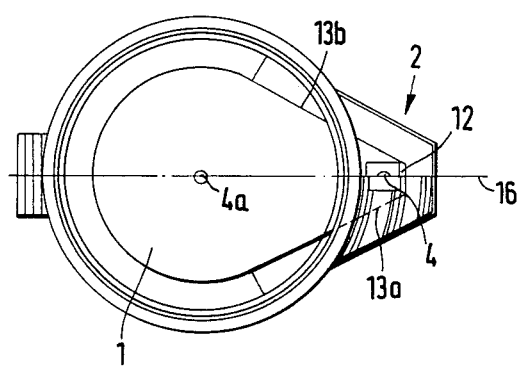
FIGS. 8 and 9 are a top views of a smelting furnace with a bay outlet, the Figures differ in contour particulars of the bay.
Figure 9:
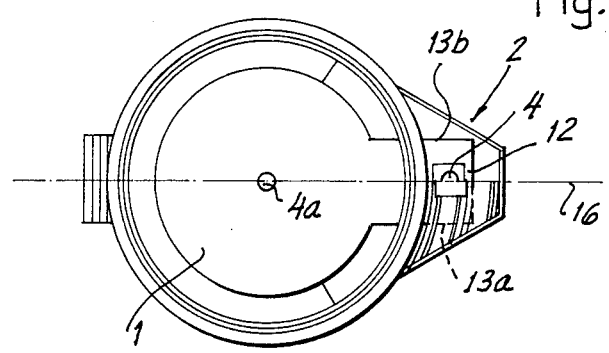

A furnace for metallurgical smelting with eccentric bay is shown in FIG. 8. The furnace vessel is provided with a bay 2 having a trapezoidal contour of the inner boundary wall 12. The wall portions 13a and 13b correspond to the legs of the trapeze and run tangential in relation to the round interior 14 of the circular or oval interior of the furnace 15. The trapezoidal contour is thus established by the two legs 13a and 13b together with the back wall which is, so to speak, the top of the trapeze as seen in elevation. The bay thus establishes three walls which serve as support against which an eddy can react if it should happen to form. In other words, the particular contour of the bay is chosen so that even if an eddy is formed during the discharge outlet, the eddy will not necessarily terminate in the slag layer so that the slag layer is not interefered with and quietly is lowered as the outpour continues. The bay can be modified in that the side walls are, in fact, opposite sides of a rectangle in which case the side walls constitute secants on the round interior of the vessel as seen in elevation. This is shown in FIG. 9. The discharge opening or duct 4 is arranged on the axis 16 of the trapeze which is an axis of symmetry. Of course, the opening 4 is situated in the bay. However, in addition to this opening there may be provided a central outlet 4a in the center axis 15 of the interior 15 of the furnace which may be used separately and not as a regular discharge outlet.

Figure 5:
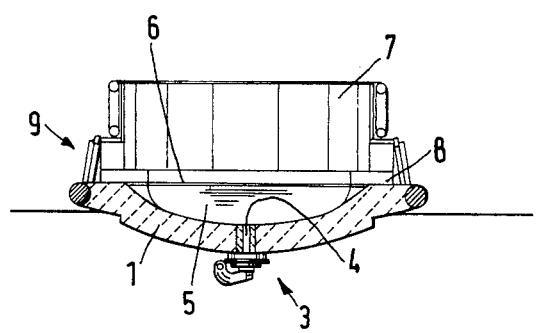
FIGS. 5, 6 and 7 are also cross sections through a smelting furnace with central discharge also showing different phases for the discharge of molten metal.
Figure 6:
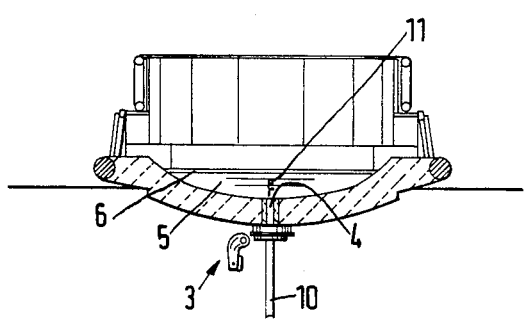
Figure 7:
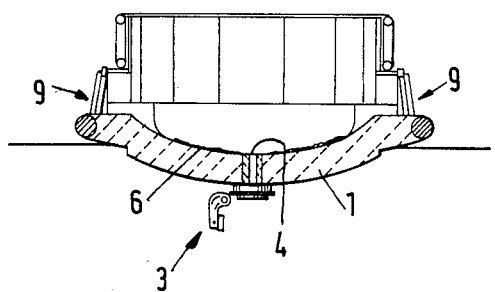

Turning now to FIGS. 5, 6 and 7, the tank 1' is somewhat modified in that it does not have a laterally extending bay portion but is basically of rotational symmetry and a central discharge opening 4' is closed by a closure member 3. Again, there is a water cooled surface 7' underneath of which there is a fire proof wall surface 8 and the surface ratio is about 9 to 1 (the range being 7:1 to 10:1). This larger ratio as compared with the asymmetrical discharge as per FIGS. 1 to 4 is made possible by the fact that the furnace is strictly in an upright position in the initial smelting phase and may remain in that position, or at least substantially so. The residual slag layer 6 is stiffened in the first place with lime so that the slag forms a more or less solid cover. In other words, lime is added to the slag to form a stiff coherent cover.

In FIG. 6, one can see that the closure member 3 is opened pursuant to the second phase and the molten metal flows centrally out of the tank 1 as a pouring flow 10, which again exhibits a near laminar flow pattern. The flow may be caught by a vessel which is not illustrated but positioned about 1 m below the furnace. The tank 1 is particularly constructed as a circular trough.

As the outflow proceeds, the melting bath level and depth becomes critical, particularly when the level approaches a range between 200 and 400 mm above the tank bottom, the formation of a potential eddy flow 11 is no longer to be excluded. However, this eddy even if formed will not be effective in the stiffened residual slag layer 6. Therefore, slag particles are not being caught in the eddy.

FIG. 7 illustrates that the steel has left the tank and the residual slag layer now is deposited on the bottom of the tank. Very little slag will flow in this last phase into the outlet duct 4', because of the coherence of the slag layer as it has stiffened. The amount of slag that can possible pass through is small simply because the major portion of the slag has been removed prior to discharge. Therefore, the slag layer 6 is very thin and occupies in total only a very low volume.

It should be noted that the vessel as per FIGS. 1 to 4, 8 and 9 can be used in similar fashion as explained with reference to FIGS. 5, 6 and 7; just a central opening 4a is needed in this case. The bay in this case could be used to accummulate residual slag through a temporary down tilt of thee bay and slag will then predominantly lodge therein. That slag may subsequently be discharged into a separate vessel.

The invention is not limited to the embodiments described above; but all changes and modifications thereof, not constituting departures from the spirit and scope of the invention, are intended to be included.

We claim:

1. Method of discharging a metallurgical smelting furnace under avoidance of slag inclusion in the outflow of molten metal wherein the furnace is provided with an external bottom outlet comprising the steps of
    providing a surface ratio in the furnace of water cooled surface area to fire proof refractory surface area in the range from 6:1 to 9:1;
    tilting the furnace by an angle that increases from zero to not more than 15° to maintain an uncritical level of molten metal above the outlet; and
    tilting the furnace back and towards an opposite tilt of not more than −6°, toward the end of the discharge so that residual molten metal and slag layer floating thereon will flow away from the outlet.
2. Method as in claim 1, selecting a temperature for discharge of the metal which is about 20° C. below subsequent treatment temperature of the molten material.
3. Method as in claim 1, and including the step of capturing the outflowing metal at a distance of not more than one meter between the external bottom outlet opening and the rim of the capturing vessel.
4. Method of discharging a metallurgical smelting furnace under avoidance of slag inclusion in the outflow of molten metal wherein the furnace is provided with an approximately centrally located bottom outlet comprising the steps of:
    providing a surface ratio in the furnace of water cooled surface area of fire proof refractory surface area in the range from 7:1 to 10:1;
    adding to the forming slag a stiffening material to render the slag highly viscous and substantially coherent; and
    maintaining a position of the furnace during outflow of molten metal such that a maximum depth of molten metal is maintained above the outlet so that in the last phases of pouring a stiffened residual slag will deposit upon the bottom for removing from the outflowing molten metal most of the slag prior to any discharge.
5. Method as in claim 4 and including the step of discharging the molten metal at a temperature which is about 20° below subsequent treatment temperature of the metal.
6. Method as in claim 4 and including the step of capturing the outpouring metal in a vessel being spaced from the external discharge outlet by not more than 1 m measured to the rim of the vessel.
7. Metallurgical smelting furnace comprising:
    a tank element and a lateral bay-like extension configured to have a near trapezoidal elevation wherein the individual legs of the trapezoid merge tangentially with the interior round configuration of the furnace tank, the bay extension and the tank each having a bottom, at least one of the bottoms being provided with a discharge outlet situated in a line of symmetry of the trapezoid.
8. Metallurgical furnace as in claim 7 wherein the bay is near rectangular and the side walls run as secants in relation to the interior of the round tank in elevation.
9. Metallurgical furnace as in claim 8, there being an additional discharge outlet centrally disposed in the bottom of the vessel.
10. Metallurgical furnace as in claim 9 wherein the bay is near rectangular and the side walls run as secants in relation to the interior of the round tank in elevation.

* * * * *